United States Patent
Nuzzi et al.

[11] Patent Number: 5,957,635
[45] Date of Patent: *Sep. 28, 1999

[54] DRILL TOOL ASSEMBLY

[75] Inventors: Joseph P. Nuzzi; Timothy G. Stokey, both of Dover, Ohio

[73] Assignee: Allied Machine & Engineering Corp., Dover, Ohio

[*] Notice: This patent issued on a continued prosecution application filed under 37 CFR 1.53(d), and is subject to the twenty year patent term provisions of 35 U.S.C. 154(a)(2).

[21] Appl. No.: 09/137,657

[22] Filed: Aug. 21, 1998

[51] Int. Cl.⁶ ........................................ B23B 51/00
[52] U.S. Cl. ..................... 408/231; 408/199; 408/230; 408/713
[58] Field of Search ................................ 408/199, 226, 408/227, 233, 228, 229, 230, 231, 713

[56] References Cited

U.S. PATENT DOCUMENTS

| | | |
|---|---|---|
| 1,017,352 | 2/1912 | Wagner . |
| 1,047,466 | 12/1912 | Wagner . |
| 1,884,182 | 10/1932 | Pearce et al. . |
| 2,237,901 | 4/1941 | Chun . |
| 2,400,856 | 5/1946 | Thompson . |
| 2,621,548 | 12/1952 | Williams . |
| 3,049,033 | 8/1962 | Benjamin et al. . |
| 3,076,357 | 2/1963 | Benjamin et al. . |
| 3,364,800 | 1/1968 | Benjamin et al. . |
| 3,460,409 | 8/1969 | Stokey . |
| 3,658,434 | 4/1972 | Benjamin et al. . |
| 4,060,335 | 11/1977 | Holloway et al. . |
| 4,115,024 | 9/1978 | Sussmuth . |
| 4,488,840 | 12/1984 | Pollington . |
| 4,493,596 | 1/1985 | Grunksy et al. . |
| 4,580,929 | 4/1986 | Gehri . |
| 4,854,789 | 8/1989 | Evseanko, Jr. . |
| 5,154,549 | 10/1992 | Isobe et al. . |
| 5,259,707 | 11/1993 | Keller . |
| 5,338,135 | 8/1994 | Noguchi et al. . |
| 5,474,407 | 12/1995 | Rodel et al. . |

FOREIGN PATENT DOCUMENTS

| | | | |
|---|---|---|---|
| 0008972A1 | 3/1980 | European Pat. Off. | 408/231 |
| 0348371A2 | 12/1989 | European Pat. Off. | 408/199 |

*Primary Examiner*—Daniel W. Howell
*Assistant Examiner*—Monica Smith
*Attorney, Agent, or Firm*—Oldham & Oldham Co., L.P.A.

[57] ABSTRACT

The invention is directed at a drill tool assembly including a holder having a shank and head portion and having a axial centerline or rotational axis on which said holder is rotated in use. The head portion includes a holder slot at least over a central portion of the head, with the slot being oriented perpendicularly to the axial centerline of the holder. The holder slot also includes a locating boss extending upwardly from the bottom of the slot, which includes first and second surfaces, with at least one of the surfaces being located in a predetermined position with respect to the axial centerline of the holder, and substantially parallel to this centerline. A drill insert having first and second cutting surfaces is selectively positioned within the holder slot, and includes a locating slot adapted to be positioned in a predetermined orientation relative to the boss provided in the holder slot. Both the position of the boss and corresponding position of the drill insert and locating slot with respect to the boss are controlled by orienting the drill insert in a predetermined manner with respect to the holder to minimize offset errors in these relative positions. In the preferred embodiment, the holder and the locating dowel or boss share a common rotational axis and the drill insert is installed in the holder in a single orientation and configured so that when it is cammed into place by an offset retaining screw, the bit indexes so that the centerline or rotational axis of the bit, locating boss and holder are substantially co-linear.

20 Claims, 4 Drawing Sheets

DRILL TOOL ASSEMBLY

TECHNICAL FIELD

The present invention relates to a drill tool assembly for drilling metallic or other materials, comprising a holder having a clamping slot in which a drill insert is positioned. More specifically, this invention relates to a drilling tool which allows the drill insert to be both self-indexing and self-aligning to prevent the user from improperly inserting the drill insert into the holder; and a method of manufacturing drill inserts.

BACKGROUND OF THE INVENTION

Drill tools are used to produce holes or countersinks in a production metalworking environment. There are known drill tools which use a drill insert having cutting surfaces selectively secured to a holder. The drill insert is generally constructed of high speed steel, carbide or other materials as necessitated by the work piece. The drill insert is fit into a corresponding slot in the holder, and is secured there with retaining screws. During a drilling operation, the holder with the drill insert in place is indexed in relation to the part. From this set point, subsequent movements of the machining operation are calculated, such as the location and the depth of the hole to be cut. During the machining operation the drill insert may become dull and replacement may be required. Ideally, the drill tool allows the holder to remain in the machine in an indexed position while the drill insert is replaced. The new drill insert needs to index to the same place within the tool holder as the original insert, and any machining errors in the insert must be minimized.

Ideally the centerline of every drill insert will correspond with the axial centerline of the holder, and the cutting surfaces or point geometry formed precisely relative to this centerline. A change in the index position of the new bit within the slot of the holder can cause significant error. Additionally, the insert itself must be machined with cutting surfaces and an overall outside diameter which must be kept to within very close tolerances to avoid other possible errors when assembled with a tool holder. Of significant importance is maintaining the outside diameter also in high tolerance with respect to the axial centerline of the tool holder. In the methods of manufacturing drill inserts of this type, no effective remedy to errors with respect to overall outside diameter and relative positioning of the cutting surfaces associated with the insert have been found. This in turn causes TIR errors when assembled with a holder and used in a drilling operation. There is therefore a need for a drilling tool, wherein a drill insert can be precisely manufactured to mate with a tool holder in a manner which provides self-indexing and self-alignment of the drill insert with respect to the tool holder.

A variety of methods of attaching a drill insert to the holder have been attempted to properly index the drill insert within the holder. Such attempts include using a locating slot formed on the bottom of the drill insert opposite the cutting edge. The slot mates with a corresponding pin or dowel positioned in the holder. The dowel pin is of a nominal size and must be manufactured within a tolerance limit, and the corresponding slot in the drill insert also has a size tolerance to allow the dowel to be inserted. These manufacturing tolerances cause a clearance to occur between the locating dowel in the holder and the locating slot in the drill insert. This clearance does not promote repeatability in placement of the drill inserts within the holder, and instead adds to the index error as described above.

Other configurations include biasing the insert against one or more seating surfaces, such as by offsetting the retaining screw hole in the tool holder with respect to the corresponding hole in the drill insert. This offset causes a camming action to occur when the retaining screw in tightened forcing the drill insert to be seated against the seating surfaces. Although this may lead to reduced errors in some cases, it is also possible that if the drill insert is positioned in the slot in an orientation which differs from the position of the insert when manufactured, the error could be increased. Though it may be possible to machine the locating slot in the insert to be exactly centered and have very low tolerances on the finished size of the slot, this requires extremely tight tolerances be kept for the placement and dimensions of the locating slot with respect to the centerline of the drill insert. Manufacturing within the tight tolerances required for this indexing system would dramatically increase the price of each drill insert. This would also make use of the insert and assembly holder more difficult, as the insert would have to be precisely positioned to receive the pin, and forced into the proper location about the locating pin.

It therefore would be desirable to have a drill tool assembly which allows a drill insert to be precisely positioned with respect to the tool holder to reduce errors in the positioning of the insert relative to the holder, but which allows simplified and consistent assembly of the insert with the holder. It would also be desirable to provide a method of manufacturing drill inserts for use with a holder which allow the drill insert to be manufactured in a manner to be consistently and precisely positioned with respect to any holder with which it is used, and to minimize errors in such positioning.

SUMMARY OF THE INVENTION

Based upon the foregoing, the invention is directed at a drill tool assembly comprising a holder having a shank and head portion and having an axial centerline or rotational axis on which said holder is rotated in use. The head portion includes a holder slot at least over a central portion of the head, with the slot being oriented perpendicularly to the axial centerline of the holder. The holder slot also includes a locating boss extending upwardly from the bottom of the slot, which includes first and second surfaces, with at least one of the surfaces being located in a predetermined position with respect to the axial centerline of the holder, and substantially parallel to this centerline. A drill insert having first and second cutting surfaces is selectively positioned within the holder slot, and includes a locating slot adapted to be positioned in a predetermined orientation relative to the boss provided in the holder slot. Both the position of the boss and corresponding position of the drill insert and locating slot with respect to the boss are controlled by orienting the drill insert in a predetermined manner with respect to the holder to minimize offset errors in these relative positions. In the preferred embodiment, the holder and the locating dowel or boss share a common rotational axis and the drill insert is installed in the holder in a single orientation and configured so that when it is cammed into place by an offset retaining screw, the bit indexes so that the centerline or rotational axis of the bit, locating boss and holder are substantially co-linear.

Accordingly, an object of this invention is to provide a novel drill tool assembly in which a drill insert may be consistently and precisely positioned so that the centerline of the drill insert, locating dowel and holder are co-linear.

It is yet another object of this invention to provide a drill tool assembly in which the user of the drill insert assembly cannot improperly position the drill insert into the holder.

It is a further object of the invention to provide a method of manufacturing a drill tool assembly or drill inserts for use with a holder wherein offset errors between the centerlines of the locating boss or dowel in a drill insert are reduced to within precise tolerances, providing that the drill insert be particularly oriented within a holder when used.

This along with other objects and advantages of the present invention will become more readily apparent from a reading of the detailed description taken in conjunction with the drawings and the claims.

BRIEF DESCRIPTION OF THE DRAWINGS

The invention and developments thereof are described in more detail in the following by way of embodiments with reference to the drawings, in which.

DETAILED DESCRIPTION OF THE INVENTION

Figure 1:
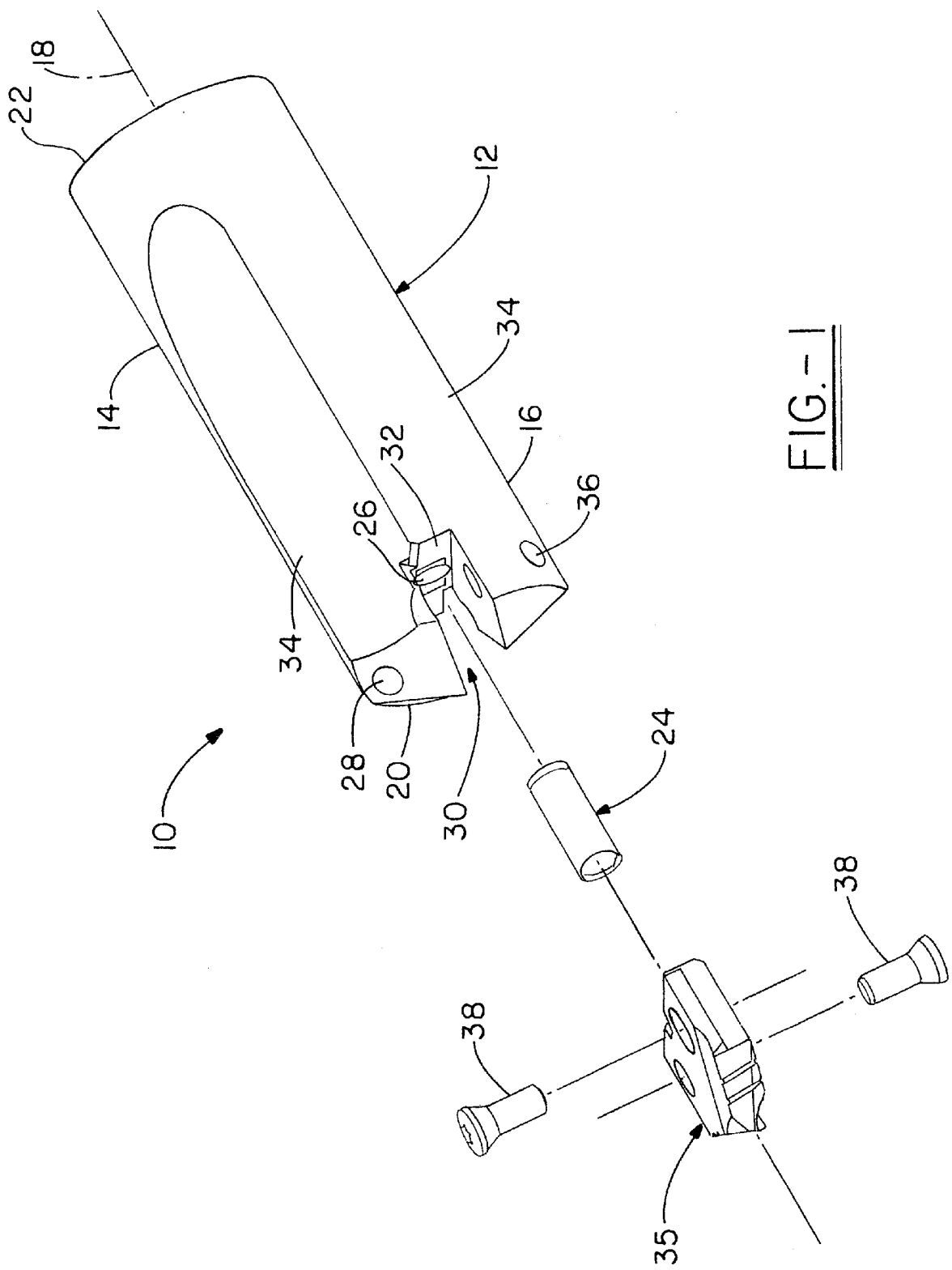
FIG. 1 is an exploded assembly view of the drill tool assembly according to a preferred embodiment.
Figure 2:
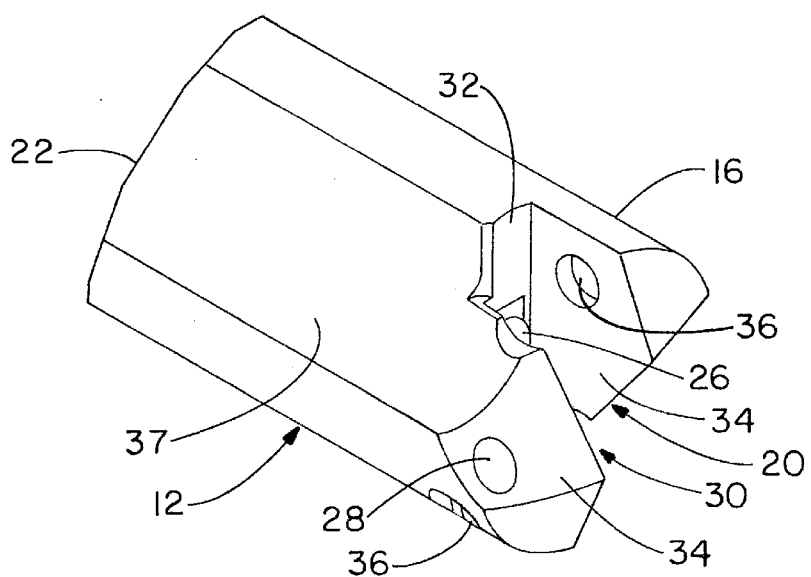
FIG. 2 is a partial perspective view of the holder associated with the assembly.

Turning now to a preferred embodiment of the invention, FIG. 1 illustrates a drill tool assembly generally indicated 10. Drill tool assembly 10 comprises a holder 12, which has a shank 14 and head portion 16 associated therewith. In the preferred embodiment, holder 12 has in general a cylindrical shape with a first end 20 and second end 22 with the second end 22 and portion of shank 14 adapted to be fixedly attached in a drilling machine for use. As shown in FIG. 2, the first end 20 of holder 12 has a clamping or holder slot 30 which may extend across the entire diameter of the head portion 16 or at least over a center portion thereof at the general location of the rotational axis 18 of holder 12. The holder slot 30 has a bottom wall 32 positioned in substantially perpendicular orientation relative to the rotational axis 18 of the holder 12. In the preferred embodiment, the assembly 10 may further include a locating boss or dowel pin 24 which is positioned precisely with respect to the axis 18 and extends from the bottom wall 32 of the holder slot 30. The pin 24 may be positioned within a hole 26 extending downwardly from the bottom wall 32 of slot 30 along the axis 18 of the holder body in a press fit other relationship to position pin 24. Alternatively, the locating boss which in the preferred embodiment comprises pin 24, may be configured in another manner to achieve the corresponding functionality of pin 24, such as an integral member extending from bottom wall 32. Within the holder slot 30, a drill insert 35 is precisely positioned with respect to the holder 12 to perform the desired drilling function in conjunction therewith. As will be hereinafter described in more detail, the insert 35 has a point geometry comprising a plurality of cutting surfaces which are precisely positioned with respect to the axis 18 of the holder 12 to minimize errors in a resulting drilling operation using assembly 10.

More particularly, the preferred embodiment of holder 12 is shown in FIG. 2, and may be configured to include at its first end 20 a pair of clamping arms 34 which extend about holder slot 30. The clamping arms 34 preferably include apertures 36 which accommodate screws 38 (see FIG. 1) to secure the drill insert 35 in its position within the holder slot 30. In the preferred configuration, the holes 36 are threaded to engage screws 38, and mate with screw holes formed in the drill insert 35 in a predetermined manner to precisely locate the drill insert in a predetermined location within holder slot 30 as will be described in more detail. Each of the clamp arms 34 may also include a lubrication vent 28 which allows the application and flow of lubrication adjacent the cutting surfaces of the drill insert to facilitate the drilling operation. The clamp arms 34 may also include angled or curved surfaces which facilitate chip removal via chip evacuating grooves 37 on each side of the holder 12. The seating surface 32 is also shown to be designed as a planar surface which corresponds to the planar bottom portion of the preferred drill insert 35, although another configuration of bottom surface 32 may be employed and is contemplated herein.

Figure 3:
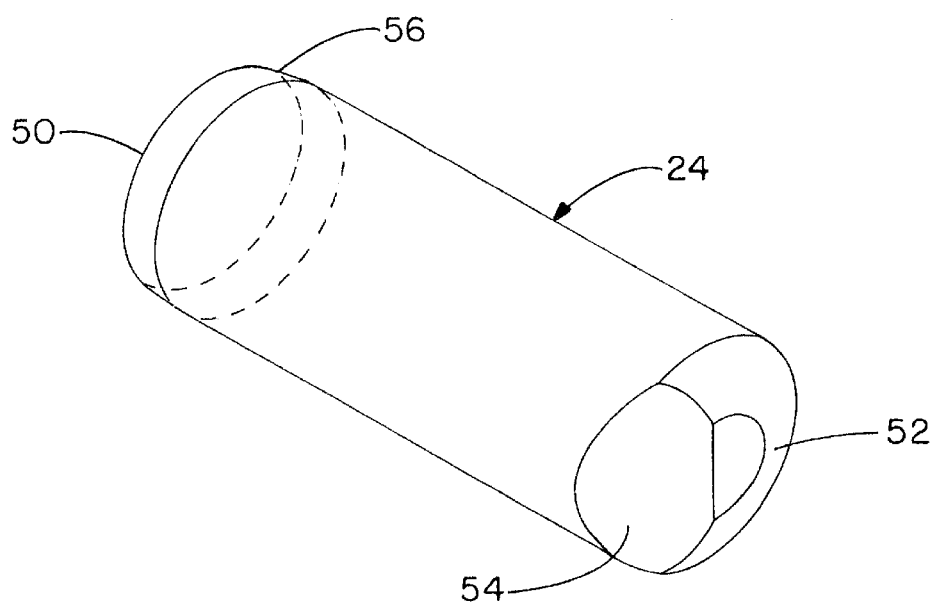
FIG. 3 is a perspective view of the locating dowel of the preferred embodiment.

Again in the preferred embodiment, the locating boss or dowel pin 24 is shown more particularly in FIG. 3. The locating pin 24 includes a first end 50 which is inserted within an aperture formed in holder 12, and particularly within the bottom or seating surface 32 of the holder slot 30 as previously described. The first end 50 may have a tapered portion 56 which simplifies insertion of the pin 24 within this aperture. The locating pin 24 may be press fit into the aperture or otherwise secured in the desired location, so as to be precisely positioned with respect to the rotational axis 18 of the holder 12 as well as with respect to the seating surface 32 of the holder slot 30. The top end 52 of the locating pin 24 includes an orienting mechanism or in the preferred embodiment an orientation flat 54. The function of the orientation flat 54 will be described hereafter.

Figure 4:
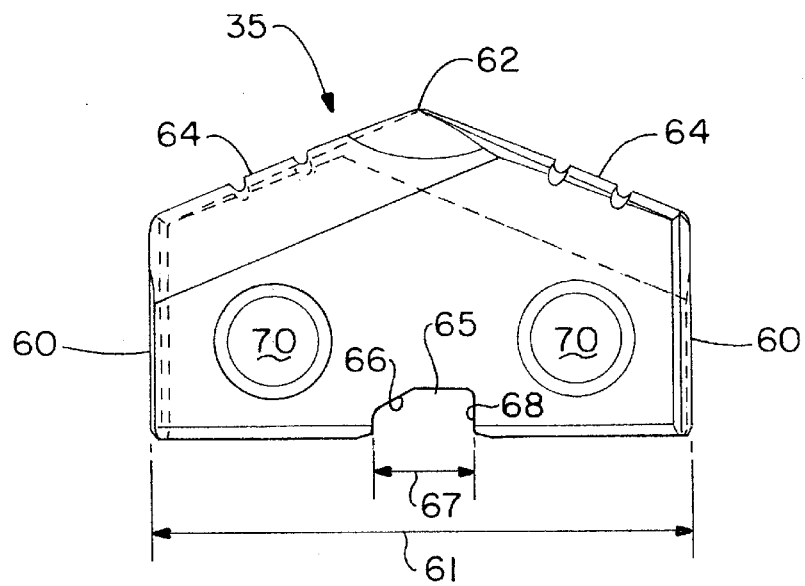
FIG. 4 is a side view of the drill insert of the preferred embodiment.

Turning to FIG. 4, the preferred embodiment of the drill insert 35 is shown. In the preferred embodiment, the drill insert 35 may form a spade drill blade, with side edges 60 of the blade being generally parallel with the rotational axis 18 of the holder 12 once the insert 35 is positioned and secured with holder 12. When secured with holder 12, drill insert 35 will also have a rotational axis which desirably is coaxial with axis 18 of holder 12. The drill insert 35 will also have a width 61 which upon being rotated with holder 12 forms an outside diameter of the assembled tool. The drill insert 35 further includes cutting edges 64 on its upper surface in the form of an obtuse V-shape, with cutting edges 64 on each side of the axial center 62. The cutting edges 64 may include a plurality of cutting components which cooperate together to provide the desired cutting surface 64 for the material and/or drilling application. In general, the insert 35 is designed to cut when rotationally driven in conjunction with holder 12 in a predetermined direction, and is not reversible, although such drilling blade configurations are known to those skilled in the art and could be used in conjunction with the present invention if desired. The drill insert 35 further preferably includes apertures 70 which cooperate with the apertures 36 in clamp arms 34 to secure insert 35 within holder slot 30 and seated against seating surface 32. Additionally, insert 35 includes a locating slot 65 having a width 67 which allows positioning of the locating pin 24 therein. In the preferred embodiment, the dimension 67 is chosen to be appreciably larger than the dimensions of the locating pin or boss 24 associated with the holder 12 and extending upwardly from bottom surface 32 of the holder slot 30. The locating slot 65 includes a seating surface 68 as well as a locating surface 66 which allow for correct and precise positioning of the insert 35 with respect to holder 12 as desired. The locating surface 66 is preferably formed as a chamfered surface which in turn will correspond with the orientation flat 54 as described with reference to locating pin 24 as will be described hereafter. Other configurations of the locating surface 66 along with corresponding orientation surface 54 would occur to those skilled in the art and are contemplated herein. In general, the locating surface 66 allows insert 35 to be positioned with respect to holder 12 in only one orientation, and further facilitates precise positioning of the insert 35 so as to minimize any tolerance errors in the drill tool assembly.

Figure 5:
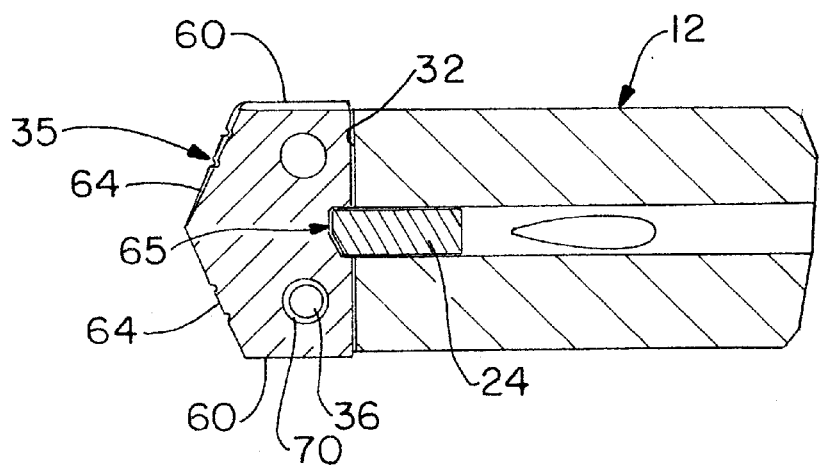
FIG. 5 shows a partial sectional view of the assembly taken along the centerline thereof.
Figure 6:
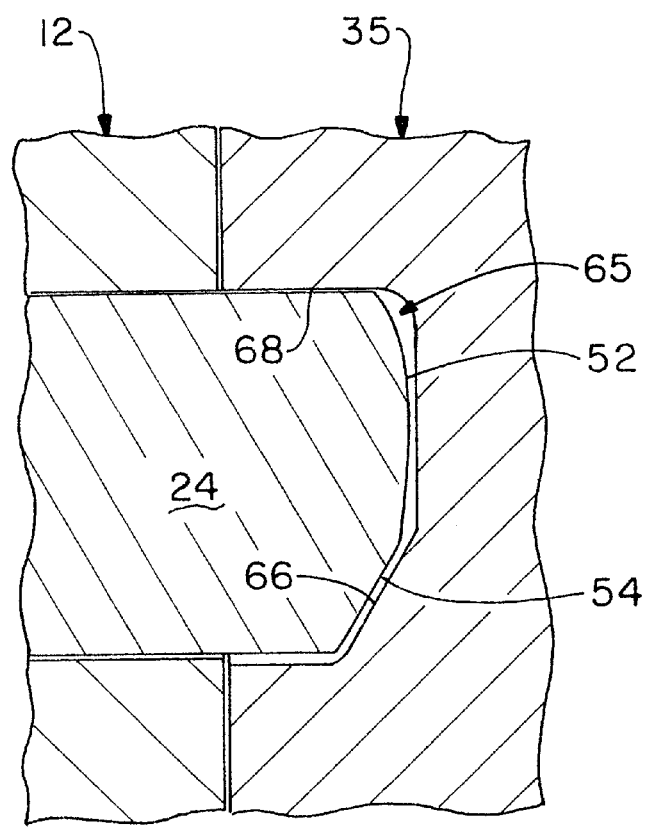
FIG. 6 is a enlarged partial sectional view showing the locating dowel positioned with respect to the locating slot of the drill insert.

Turning to FIGS. 5 and 6, the assembled tool 10 is shown in cross section, indicating the cooperative relationship between insert 35 and holder 12. As seen in this figure, the insert 35 is positioned so as to be seated against the bottom surface 32 of the holder slot for operation. In addition, the insert 35 is precisely positioned such that the point geometry comprising the cutting surfaces 64 thereof is precisely configured relative to the rotational axis of the holder 12. In this way, the effective outside diameter of the insert 35 when rotationally driven in conjunction with holder 12 is precisely controlled. As seen more distinctly in FIG. 6, insert 35 is positioned such that locating slot 65 cooperates with locating pin 24 in a predetermined manner. More particularly, the locating surface 66 of slot 65 cooperates with the orientation flat 54 of pin 24 to allow insert 35 to only be positioned in this orientation relative to holder 12. It is also seen in FIG. 5, that in the preferred embodiment, the apertures 36 formed in the clamp arms 34 of holder 12 are formed in offset relationship to apertures 70 formed in insert 35. Additionally, each of the apertures 36 and 70 are preferably formed with countersunk portions formed as a bearing surface adapted to be engaged by a corresponding tapered or like surface on the screws or other fastening mechanism 38. The enlarged clamping head of the screws 38 may be of any convenient shape, such as conical, ball-shaped, or in another form to correspond with the similar surfaces in the tool holder 12 and insert 35. In a typical fashion, by offsetting the axes of the apertures 36 and 70, upon securing insert 35 within slot 30 by means of screws 38, the insert 35 will be forced downwardly against the seating surface 32 and also the seating surface 68 of slot 65 will be forced against locating boss 24. The location of boss 24 and therefore of seating surface 68 is predetermined to position the point geometry of insert 35 to coincide with rotational axis 18 of holder 12.

By precisely positioning surface 68 with respect to the outside dimensions and point geometry of insert 35, the assembled tool will virtually eliminate errors in positioning of the insert 35 with respect to holder 12. This degree of accuracy is accomplished by machining the insert 35, and particularly those dimensional characteristics mentioned above, in an orientation relative to a work piece holder which simulates holder 12 of the assembly 10. Thus, the invention includes a method of manufacturing inserts 35 in a precise orientation relative to a work piece holder, which will in turn translate to the positioning of insert 35 with respect to any tool holder 12 with which it may be used. The method of the invention includes providing a blank work piece which is to be machined to form insert 35. A work piece holder including a seating surface and a locating boss or pin extending upwardly from the seating surface is provided. The locating boss has an orientation surface, and the work piece has a locating slot including seating and locating surfaces. The work piece blank is positioned such that the orientation surface of the locating pin cooperates with a locating surface in the locating slot of the work piece to allow seating of the work piece blank against the seating surface of the work piece holder and the seating surface of the slot against the locating boss. The method further includes the step of machining at least the outside dimensions of the work piece once it is positioned with respect to the work piece holder.

Figure 7:
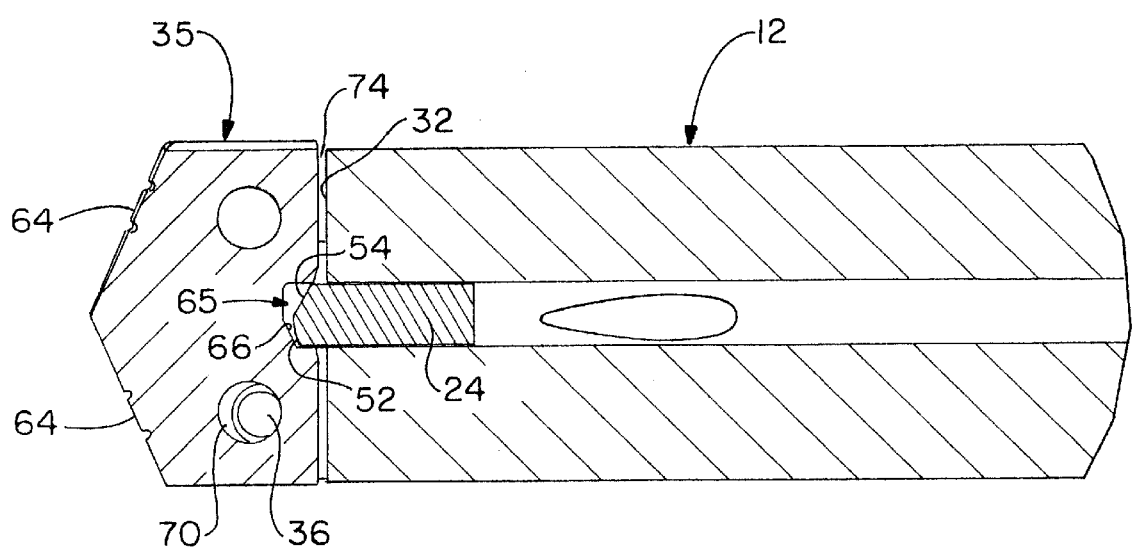
FIG. 7 is a sectional view of the assembly showing the drill insert inserted improperly.

As shown in FIG. 7, if the insert 35 is not oriented properly with respect to holder 12, the portion of top end 52 adjacent orientation flat 54 will bear against portion 66 of the locating slot 65 so as not to allow insert 35 to be seated against seating surface 32 of holder slot 30. Additionally, the apertures 36 and 70 in the holder 12 and insert 35 respectively, will not align to allow the screw or other fastening mechanism to be operative. Thus, the insert 35 cannot be inserted improperly, thereby ensuring that the insert 35 is properly positioned with respect to the holder 12 as desired. This cooperative relationship of the insert 35 with respect to the holder 12 allows precise positioning of the insert which is manufactured according to the method of the invention to minimize possible errors which could occur in such positioning. It will be recognized by those skilled in the art, that prior to the present invention, a locating slot is formed in a work piece to be machined into a drill insert. The drill insert could be assembled on a work piece holder in a first orientation, and thereafter the drill insert outside diameter would be machined with the work piece in this orientation. Upon subsequent use of the insert with a tool holder, the insert could be oriented in the opposite orientation to that of the manufacturing process. In this way, errors which could occur in machining will be exacerbated in subsequent assembly of the insert with the holder. In the present invention, the drill insert work piece is positioned in a particular orientation to a locating slot simulating the holder, and the outside diameter and point geometry is precisely machined in the predetermined orientation, thereby virtually eliminating TIR errors in subsequently assembly with a holder. The same slot side of the work piece is used to locate both the work piece and subsequently machined insert by means of the orientation mechanism associated with both locating boss and locating slot in the insert. The present invention therefore provides a method and apparatus which virtually eliminates TIR between the outside diameter of the insert and point geometry in a desirable manner.

The foregoing description relates to various preferred embodiments of the invention, which is directed to obtaining those objectives and advantages of the invention contemplated herein. No unnecessary limitations are to be implied, and the embodiments of the invention are by way of example only. Various changes and modifications would occur to those skilled in the art, and are contemplated herein as falling within the scope of the invention.

What is claimed is:

1. A drill tool assembly comprising:
    a holder having first and second ends and a rotational axis, wherein said second end is adapted to be fixedly attached in a drilling machine, and said first end comprises a holder slot having a bottom seating surface over at least a portion of said holder slot, said holder slot also including a locating boss extending from said bottom seating surface and having at least a first orientation surface on at least a portion thereof,
    a drill insert having first and second sides, said first side adapted to have at least a portion thereof positioned in said holder slot in seating engagement with said bottom seating surface and including a locating slot formed in said bottom side, said locating slot including at least a second orientation surface which cooperates with said first orientation surface to allow said insert to be seated against said bottom seating surface only if oriented properly with respect to said holder slot.

2. The drill tool assembly according to claim 1, wherein said holder further includes at least one clamp arm provided adjacent said holder slot, said at least one clamp arm including at least one bore communicating with said holder slot, wherein a fastening mechanism is positioned in said bore to engage said drill insert for securing said insert within said holder slot.

3. The drill tool assembly according to claim 2, wherein said drill insert includes at least one bore cooperating with said at least one bore in said at least one clamp arm, wherein a fastening mechanism engages said at least one bore in said drill insert for securing it in position within said holder slot.

4. The drill tool assembly according to claim 3, wherein said at least one bore in said at least one clamp arm is offset from said at least one bore in said drill insert at least to urge said drill insert against said bottom seating surface of said holder slot.

5. The drill tool assembly according to claim 1, wherein said locating boss of said holder slot further includes at least a first seating surface being disposed in predetermined relationship to said rotational axis, and wherein said locating slot of said drill insert has a portion thereof seated against said first seating surface.

6. The drill tool assembly of claim 1, wherein said holder slot is oriented substantially perpendicularly to said rotational axis of said holder.

7. The drill tool assembly according to claim 1, wherein said locating boss includes at least a first seating surface which is located in a predetermined position relative to said rotational axis, and is oriented substantially parallel thereto.

8. The drill tool assembly of claim 1, wherein said locating boss is a dowel pin having first and second ends, wherein said first end is received in a bore formed in said locating slot, and said second end extends from said bottom seating surface of said holder slot a predetermined distance.

9. The drill tool assembly of claim 1, wherein said first orientation surface of said locating boss has a predetermined shape, and said second orientation surface of said locating slot substantially matches said shape so that said first and second orientation surfaces mate with one another so as to be positioned adjacent one another when said drill insert is oriented properly with respect to said holder slot.

10. The drill tool assembly of claim 1, wherein said drill insert is generally plate shaped and has a predetermined width which defines the outside diameter of a bore formed by said assembly.

11. The drill tool assembly of claim 1, wherein said second side of said drill insert includes at least one cutting surface formed thereon.

12. The drill tool assembly of claim 1, wherein said second side of said drill insert includes at least two cutting surfaces extending from a central point, and defining the point geometry of the insert.

13. The drill tool assembly according to claim 12, wherein said point geometry of said drill insert is positioned in predetermined relationship to said rotational axis of said holder.

14. The drill tool assembly according to claim 1, wherein a biasing mechanism urges said drill insert at least against said bottom seating surface of said holder slot if oriented properly with respect to said holder slot.

15. The drill tool assembly according to claim 1, a biasing mechanism urges said drill insert at least against a surface of said locating boss to position said drill insert in predetermined relation to said rotational axis.

16. A drill insert for use in a drill tool assembly comprising:

a body member having a first side including at least one cutting surface associated therewith and a second side including a locating slot formed therein, said locating slot including at least one orientation surface enabling said drill insert to be positioned in only one orientation in a holder with which said drill insert is to be used.

17. The drill insert according to claim 16, wherein said body is generally plate shaped having first and second side edges which define a predetermined width, and wherein said locating slot has at least one seating surface positioned in predetermined relationship to said side edges.

18. The drill insert according to claim 17, wherein said at least one seating surface is oriented substantially parallel to the side edges of said body member.

19. The drill insert according to claim 16, wherein said orientation surface is a chamfered surface.

20. The drill insert according to claim 16, wherein said first side of said body includes at least two cutting surfaces extending from a central point of said first side and defining a point geometry which is positioned in predetermined relationship to at least one seating surface associated with said locating slot.

* * * * *